United States Patent [19]

Iseki

[11] 4,218,835
[45] Aug. 26, 1980

[54] ANIMAL SCALE TOY

[75] Inventor: Takeo Iseki, Tokyo, Japan

[73] Assignee: Tomy Kogyo Co., Inc., Tokyo, Japan

[21] Appl. No.: 932,769

[22] Filed: Aug. 11, 1978

[51] Int. Cl.² .................... G09B 19/02; G09B 23/02
[52] U.S. Cl. .................................. 35/31 R; 177/47;
177/157; 177/198; 273/1 R
[58] Field of Search .................... 177/47, 157, 198;
273/1 R, 1 J; 235/1 E; 35/9 R, 30, 24 C, 31 R

[56] References Cited

U.S. PATENT DOCUMENTS

| | | | |
|---|---|---|---|
| 680,888 | 8/1901 | Roth | 177/47 |
| 2,260,691 | 10/1941 | Popov | 177/47 |
| 2,402,892 | 6/1946 | Hubble | 35/31 R |
| 3,424,455 | 1/1969 | Dunson | 273/1 J |
| 3,742,619 | 7/1973 | Jenks | 35/30 |
| 3,744,792 | 7/1973 | McClary et al. | 273/1 J |
| 3,774,908 | 11/1973 | Greenberg | 273/1 J |
| 3,809,396 | 5/1974 | Leicht et al. | 273/1 J |
| 3,934,357 | 1/1976 | Couvillion | 35/31 C |

FOREIGN PATENT DOCUMENTS 650205  2/1951  United Kingdom .................... 35/31 R

OTHER PUBLICATIONS

General Merchandise Co. Catalogue Fall 1960, Summer 1961, p. 619.

Primary Examiner—John W. Shepperd
Attorney, Agent, or Firm—K. H. Boswell; Edward D. O'Brian

[57] ABSTRACT

A toy balancing scale used to teach children the proper relationship between the number of objects and/or the value of numbers, has a base having an upstanding support and pivoted on the support is a horizontal balance bar. At each end of the balance bar is a small peg on which objects can be attached.

On the backside of the balance bar is a housing having essentially a "spade-like" shape. The distance within the housing from the top of the spade to the bottom of the stem of the spade is longer than the distance from the top of the spade to the side projections. Mounted on the support is a sliding member having a peg which projects normal to the surface of the sliding member. The member slides vertically in the support and the peg fits in the spade-like housing. When the peg is at the top of the housing the balance bar is held in a locked position about the peg. A clanger and bell mechanism is activated by the sliding member when the member is free to travel this greater distance. If, however, i.e., the balance arm is unbalanced, the member will only be free to travel a limited amount and the clanger and bell mechanism will not be activated. This allows a child to determine whether or not the number of objects or the numbers on one side of the balance bar are equal to the number on the other side of the balance bar.

10 Claims, 10 Drawing Figures

U.S. Patent Aug. 26, 1980 Sheet 1 of 2 4,218,835
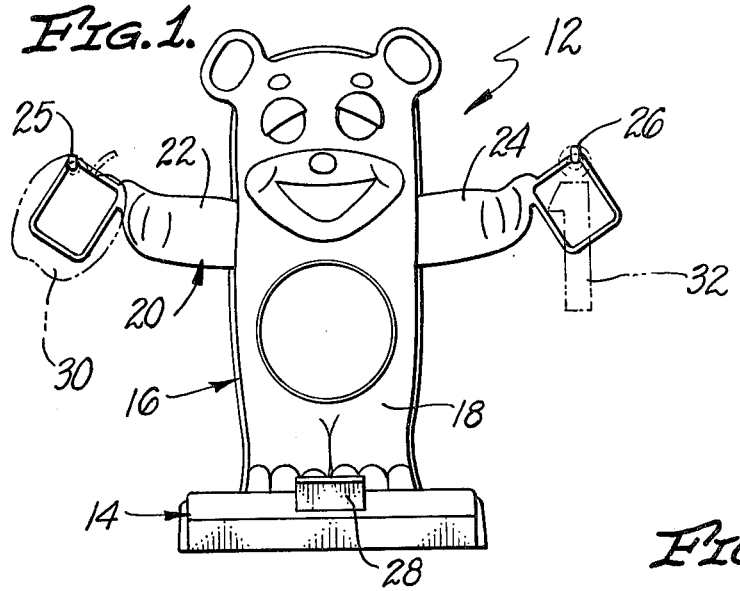
FIG. 1.
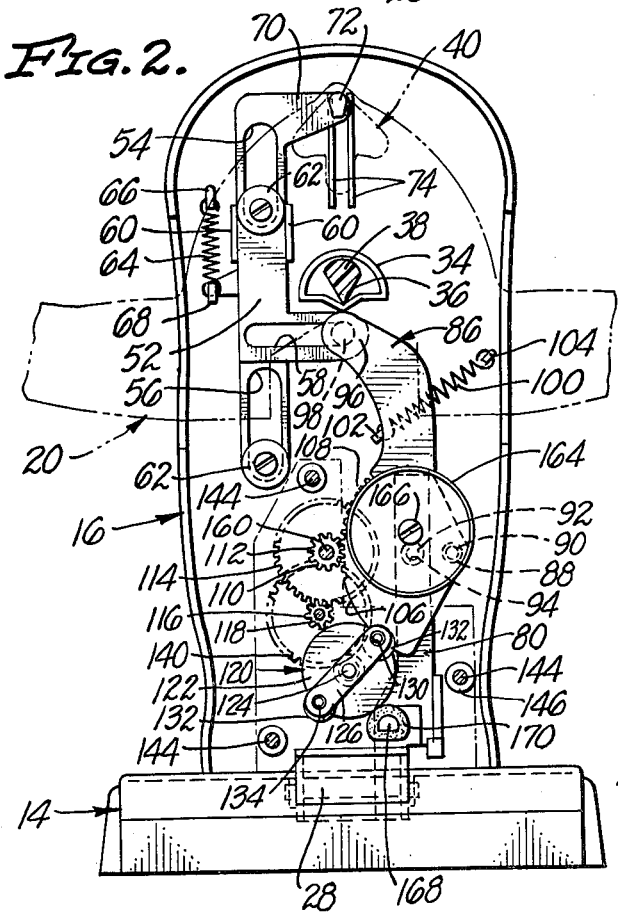
FIG. 2.
FIG. 3.

ANIMAL SCALE TOY

CROSS REFERENCE

This application is related to a design application entitled Toy Weighing Device, filed with the Patent and Trademark Office on May 30, 1978 Ser. No. 911,676 the disclosure of which is hereby incorporated by reference.

BACKGROUND OF THE INVENTION

This invention is directed to a new and improved toy balancing device.

Numerous counting devices are known which rely on the fact that an object based either upon its weight or its placement is compared to one or more other objects by simply placing the objects on opposite sides of a lever arm and comparing whether or not the lever arm remains in balance. Intellectually such devices can be geared to a child's level and be used to teach the child number recognition and/or simple addition or subtraction. More sophisticated devices such as that shown in U.S. Pat. No. 3,742,619 have employed this type of principle to teach adults more sophisticated relationships.

Because children tend to have very limited attention spans, the above mentioned devices which simply consist of a balance bar are not sufficiently interesting enough for children to hold their attention for the time required for them to learn multiple relationships among numbers, objects, etc. Additionally most of these devices directed toward children must be mass produced and as such do not contain precision components. Typical of these devices is a device which is simply a first class level suspended on a fulcrum block. Since the pivot point on these devices is exposed, for safety sake, it cannot be in the shape of a knife edge but instead must be rounded and is therefore less accurate. Because of this as the child loads objects upon an arm, friction can sometimes hold the arm in place and not allow the child to discriminate between two very closely related numbers.

Other balance devices have been manufactured which incorporate a bell within the device to signal when the device is out of balance. In such devices if the balance arm is always free, i.e. does not incorporate a fixed rest position, unless the child puts the correct number of objects on both side of the arm simultaneously, the bell will continually sound and in effect this will distract the child before the child completes the solution of the problem being solved with the balance device.

SUMMARY OF THE INVENTION

In view of the above it is felt that there is a need for new and improved toy balancing devices to be used by children in teaching them the value of numbers and the relationship of sets of numbers. It is therefore an object of this invention to provide for this need. It is a further object to provide a balancing device which is both simple to use yet will allow the child to complete his proposed solution of a problem before a bell or other signal is sounded. Additionally it is an object to provide a toy balance device which is easily and economically constructed yet safe, durable and enjoyable to the user.

These and other objects are met by providing a toy balance device of the type having a base and a vertical support extending upward from the base and attached to the vertical support a horizontal balance bar, the improvement which comprises: having the balance bar pivotally attached to the support and having the balance bar including a locking-detecting means which comprises a peg, a peg housing, and a sliding member attached to the support and in addition an indicating or correct answer signaling means, and having the peg attached to either the sliding member or the balance bar and a peg housing attached to the other, the peg fitting within the peg housing and traveling from a locked position to a balance position when the bar is in balance or from the locked position to an unbalanced position when the bar is not in balance, and further having the sliding member slide in the support between a first position when the peg is in a locked position to an intermediate position when the peg is in the unbalanced position or through the intermediate position to a second position when the peg is in the balanced position, and when the sliding member is in the second position, the indicating means indicates that the bar is in balance.

BRIEF DESCRIPTION OF THE DRAWINGS

This invention will be better understood when taken in conjunction with the drawings wherein:

FIG. 1 shows an isometric view of the front of the toy balancing device;

FIG. 2 shows a front elevational view in section of the device shown in FIG. 1;

FIG. 3 shows a side elevational view in section of the device shown in FIG. 1;

Figure 4:
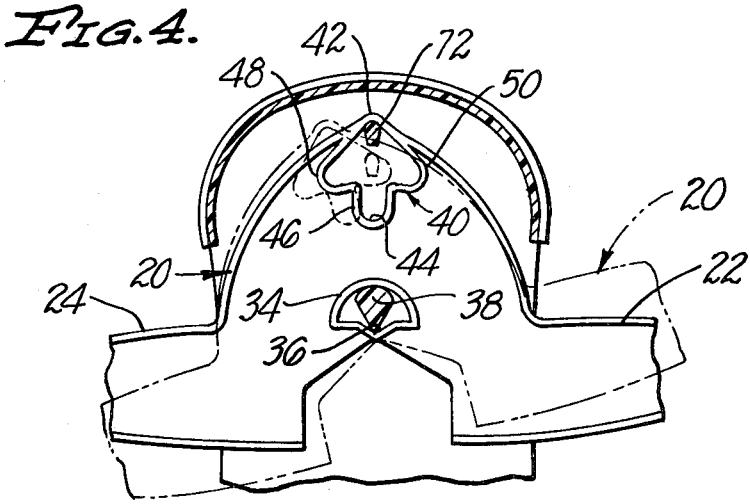
FIG. 4 is a front elevational view of a portion of the device taken at the line 4—4 in FIG. 3.

The invention illustrated in this specification and drawings utilizes certain concepts and principles as are set forth and defined in the appended claims forming a part of this specification. Those skilled in the art will readily realize that these concepts and principles can be applied to a number of differently appearing toy balancing devices by the utilization of routine engineering skill. For these reasons, the invention is to be construed in light of the claims.

DETAILED DESCRIPTION

The toy balancing device 12 as shown in FIG. 1 has a base 14 and a vertical upstanding support 16. As shown in the figures the toy 12 is in the generalized shape of an animal. Fitting on the support 16 is a front 18 which follows the theme of the toy and includes details of the animal such as a facial expression, feet, etc. The balance bar 20 fits onto the support and is in part covered by front 18. The portions of the balance bar 22 and 24 exposed out of the support and the front continue the animal theme and are in the shape of arms. Attached at the end of the balance bar or arms are a right and left object hook 25 and 26 respectively. Fitting within the base is a push button 28 the function of which will be described in detail in a subsequent portion of this specification. As shown in FIG. 1 certain objects collectively identified by numeral 30 or numbers collectively identified by numeral 32 can be attached to the object hooks 25 and 26 on the balance bar 20.

Figure 5:
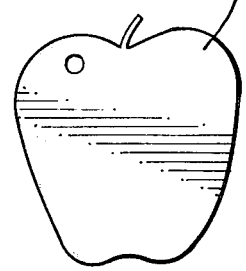
FIG. 5 is an isometric view of a weighing object to be hung on the device as shown in FIG. 1.
Figure 6:
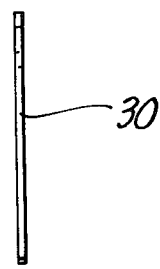
FIG. 6 is a side view of the object shown in FIG. 5.
Figure 7:
FIGS. 7 and 9 are front views of number objects to be hung on the device as shown in FIG. 1.

Attached to the back of the support 16 is a pivot support 34 having a small wedge shaped depression 36 which serves as a fulcrum point. A pivot, in the shape of a knife edge 38, extends from the balance bar 20 and, as can best be seen in FIG. 5, fits into the pivot support 34 and rests in point 36. This allows the balance bar 20 to freely swing in respect to the support 16 as shown in phantom in FIG. 5. Also attached to the balance bar 20 is a housing 40 having a shape which can best be described as "spade-like", that is resembling a spade typically found on a playing card. As will be described in greater detail later the housing 40 is so dimensioned such that the distance from the point 42 to the bottom 44 of the stem-like projection 46 of the housing 40 is greater than the distance from the point 42 to either the left or right side projections 48 and 50 respectively, of the housing 40.

Slidably mounted on the support 16 is a member 52. Member 52 has two vertical cut-out portions 54 and 56 and one horizontal cut-out portion 58. Member 52 is slidably held between projections 60 on support 16 and retained against the support 16 by screws and washers collectively identified by numeral 62. A spring 64 attached to support 16 by ear 66 and attached to member 52 by ear 68, biases member 52 toward the top of the apparatus 12. An extension 70 of member 52 extends towards the center of support 16 and culminates directly over the center of pivot support 34. A peg 72 projects normal to the surface of extension 70 directly over the center of housing 40. On the rear side of extension 70 a small peg not seen in the illustrations travels within the channel created by projections collectively identified by numeral 74 projecting out of support 16.

For the purposes of illustration in this specification, the pivot support 34 is shown to be attached to support 16 and the knife edge 38 is shown attached to balance bar 20. It is recognized that the pivot support 34 could be attached to the support 16. If the toy were so constructed it would be necessary to turn both the pivot support and knife edge 180 degrees so that the balance bar 20 would be suspended on the knife edge 38. Further, for the purpose of this specification, the housing 40 is shown attached to the balance bar 20 and the peg 72 is shown as attached to member 52; however, the housing 40 and the peg 72 could be reversed so that the housing would be attached to the member 52 and the peg would be attached to the balance bar 20. As with the pivot support 34 and the knife edge 38 above; if it was so desired to construct the toy reversing the placement of peg 72 and housing 40, it would also be necessary to rotate the housing 40 180 degrees to allow for proper interaction of the peg and the housing.

Peg 72 fits within the housing 40 on balance bar 20. In a normal or rest position, under the influence of spring 64, member 52 is in its uppermost position and peg 72 rests in uppermost point 42 in housing 40. This locks balance bar 20 in a horizontal position and relieves the stress between pivot support 34 and knife edge 38. When peg 72 travels in a downwardly direction as member 52 slides toward the base 14 of apparatus 12, as hereinafter described, peg 72 traverses the interior of housing 40 and if the balance bar 20 is in balance and thus remains in a horizontal position, peg 72 is free to enter stem-like projection 46. If, however, the balance bar 20 is not in balance as shown in phantom in FIG. 5, when member 52 slides in respect to support 16, peg 72 which initially maintains balance bar 20 in a rest position, descends downward and balance bar 20, because it is in an unbalanced state, tilts causing peg 72 to slide within housing 40 and come to rest within one of either the left or right side projections 48 or 50 of housing 40. As noted above, the distance from point 42 in housing 40 to the bottom 44 of the stem-like projection 46 is greater than the distance from point 42 to either the right or left projection 48 or 50 of housing 40. Because of this when the balance bar 20 is in balance the peg 72, in going from point 42 to the bottom 44 of stem 46, travels a greater distance than going from point 42 to either right or left projection 48 or 50. Since peg 72 is attached to the member 52, consequently, member 52 also descends further downwardly on support 16 when peg 72 travels to the bottom 44 of stem 46 than when peg 72 goes to either of the projections 48 or 50.

Push button 28 is pivotally attached to base 14 about two axle projections, commonly identified by the numeral 76, which fit into two bearing journals, commonly identified by numeral 78, on base 14. A linking member 80, slidably mounted on support 16, has a foot portion 82 which fits under ridge 84 on push button 28. When push button 28 is depressed into base 14, the motion of push button 28 is transferred to linking member 80 by ridge 84 pressing against foot portion 82 causing linking member 80 to slide down support 16 toward base 14.

A lever 86 having a cylindrical bearing 88 is pivotally mounted about pin 90 projecting from support 16. A pin 92 projects normal from the surface 86 and fits within a hole 94 in linking member 80. This serves to transfer the movement of linking member 80 to lever 86. Near the upper end 96 of lever 86 a pin 98 projects normal to the surface of the lever 86 and fits within horizontal cut-out 58 on member 52. The motion of push button 28 is transferred from linking member 80 to lever 86 and in turn to member 52. Because of the placement of pin 92 with respect to the cylindrical bearing 88, when linking member 80 is pulled toward the base 14 by push button 28, pin 98 on the upper end 96 of lever 86 travels both horizontally to the left and vertically down as pin 98 slides in horizontal cut-out 58. The downward vertical movement of pin 98 causes member 52 to slide in a downward direction against the bias of spring 64. Because of the interconnection of member 52 and lever 86, the amount of rotation of lever 86 about cylindrical bearing 88 is governed by the limit of travel of peg 72 within housing 40, as previously described. Lever 86 is biased by spring 100 attached to ears 102 and 104 on lever 86 and support 16, respectively, such that pin 98 in a rest position is in the extreme right side of horizontal cut out 58. Additionally linking member 80, because it is connected to lever 86, is biased in an upwardly direction.

As shown in FIG. 2, the left hand side of lever 86 has a rounded section 106 having gear teeth 108 along the periphery of section 106. Gear teeth 108 mesh with the gear teeth 110 on the inner portion of gear wheel 112. The outer gear teeth 114 on gear wheel 112 in turn mesh with the inner gear teeth 116 on gear wheel 118. A rotary clanger 120 consists of a flywheel 122 having a central axle 124 and a retaining member 126 which has a spacer 128 and two holes collectively identified by the numeral 130. Two washers, both identified by the numeral 132, fit around two small projections, both identified by the numeral 134, projecting from the flywheel 122 through the holes 130 in retaining member 126. The washers 132 are maintained on the projections 134 by the spacer 128 which is frictionally fitted to the axle 124. On the bottom side of the flywheel 122 there is a cylindrical extension 136 having gear teeth 138 around its perimeter. The outer teeth 140 of gear wheel 118 mesh with the gear teeth 138 on the rotary clanger 120.

A cover 142 is attached to support 16 by screws, collectively identified by the numeral 144, which screw into projections 146 integrally formed with support 16.

Cover 142 has three holes 148, 150 and 152 respectively in its surface. One end of axle 124, to which flywheel 122 is attached, fits into hole 148 and the other end fits into a round boss 154 on support 16. Gear wheel 118 has an axle 156; one end of this axle fits into hole 150 and the other end fits into a round boss 158 on support 16. Gear wheel 112 has an axle 160. One end of this axle fits into hole 152 in cover 42; however, contrary to the other axles, the other end of axle 160 does not fit into a round boss but instead fits into an elongated boss 162 on the surface of support 16. This allows axle 160 to pivot about the point where axle 160 slides back and forth in boss 162 and allows the outer teeth 114 on gear wheel 112 to reversibly disengage from the inner teeth 116 on gear wheel 118. As lever 86 moves in response to movement of push button 128, as previously described, rotary clanger 120 is spun by the motion transferred from lever 86 by gear wheels 112 and 118. Because rotary clanger 120 contains flywheel 122, once it is sent spinning, its momentum and consequently its spinning motion is maintained. Once rotary clanger 120 is started spinning axle 160 slides in boss 162 tilting gear wheel 112 and disengaging gear wheel 112 from gear wheel 118. The rotary clanger 120 continues to spin until either the frictional force between gear teeth 114 bouncing across gear teeth 116 stops the rotary clanger 120 or rotary clanger 120 is physically stopped as hereinafter described.

A bell 164 is attached to lever 86 by a screw 166. Bell 164 is so placed on lever 86 that as lever 86 rotates around circular bearing 88 bell 164 approaches rotary clanger 120. If balance bar 20 is in an unbalanced position the limit of travel of peg 72 through the housing 40 is inhibited as previously described and consequently the limit of travel of lever 86 about cylindrical bearing 88 is also inhibited. Because of this bell 164 does not approach rotary clanger 120 close enough for washers 132 to strike the bell 164. If, however, balance arm 120 is in balance, peg 72 is free to travel to the bottom 44 of stem 46 in housing 40. This allows member 52 to assume its greatest downward deflection and consequently lever 86 to assume its maximum rotation about cylindrical bearing 88. As a consequence, bell 164 comes within the circular pathway of washers 132 and washers 132 strike bell 164 causing bell 164 to ring.

A projection 168 on linking member 80 is fitted with a rubber ring 170. When peg 72 is resting in point 42 in housing 40 the rubber ring 170 on linking member 80 rests against rotary clanger 120 as shown in FIG. 2. When push button 28 is depressed linking member 80 moves downward allowing rubber ring 170 to disengage from rotary clanger 120. When the push button 128 is released linking member 80 moves upward to its rest position and rubber ring 170 contacts rotary clanger 120 stopping its motion.

Figure 8:
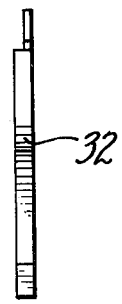
FIGS. 8 and 10 are side views of the object shown in FIGS. 7 and 9 respectively.
Figure 9:
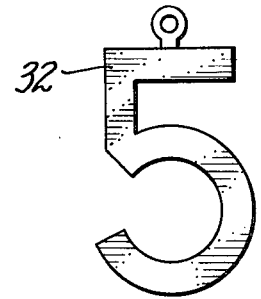
Figure 10:
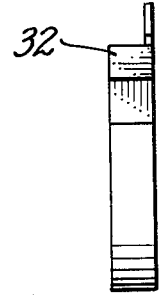

As is shown in FIGS. 5 through 10 the toy balance includes two classes of hanging objects, objects 30 and numbers 32, which can be attached to object hooks 25 and 26. The objects 30 are all constructed to weigh a certain integral weight, the numbers 32 each are constructed to weigh their number value times the integral weight of the objects 30. Thus as can be seen in FIG. 8 the numeral 2 is twice as thick as the object 30 shown in FIG. 6 and in fact weighs about twice what the object 30 weighs. This relationship is maintained throughout a complete set of numerals and as shown in FIG. 10 the numeral 5 is quite bulky compared to object 30 shown in FIG. 6 and in fact weighs five times the weight of the object.

In use, if a child should place one object on one side of balance bar 20 he would be required to place either one object or the numeral 1 on the other side of the balance bar 20 in order for the balance bar 20 to remain balanced. If for example the child places three objects on one side of the balance bar 20, the child would have to place either the numeral 3 or both the numerals 1 and 2 for the balance bar 20 to remain in balance. Alternately the child could place a numeral on one side of the balance bar 20, for example numeral 5, and then would have to place either a 4 and 1 combination or a 2 and 3 combination on the other side of the balance bar 20.

To use the toy the child places the objects as described above on the object hooks 25 and 26. At this time whether or not the balance bar 20 is in balance, the balance bar 20 remains in a horizontal position by virtue of peg 72 fitting into point 42 in housing 40. To see if the child has placed the correct amount of objects on both sides of the balance bar 20, the child pushes push button 28 which disengages peg 72 from point 42 in housing 40 as previously described. If the child has not placed the correct number of objects on the different sides of balance bar 20, the bar 20 will tilt toward the side having the most mass and peg 72 will slide into either left or right projection 48 or 50. Member 52 will not be fully downwardly deflected and consequently lever 86 will not be fully rotatably deflected. While rotary clanger 120 will be sent spinning by the motion of the gear wheels the bell 164 will not approach close enough to be rung, indicating to the child that he did not have the correct number of objects upon the balance bar 20.

If indeed the child does have the correct number of objects on the balance bar 20, peg 72 will fit into the bottom 44 of the stem 46 of housing 40 allowing member 52 to assume its full rotary deflection causing bell 164 to come close enough to rotary clanger 120 to allow washers 132 to strike the bell 164 causing it to sound and thus informing the child that he has the correct number of objects on the balance bar 20.

I claim:

1. A toy balancing device of the type having a base and a support extending from the base, a balance bar pivotally supported on said support, the improvement which comprises:
   one of said support and said balance bar having a pivot support means to pivotally support said balance bar on said support;
   a balance bar locking-detecting means;
   said balance bar locking-detecting means including a peg means, a peg housing means, a sliding means slidably mounted on said support, and an indicating means;
   one of said peg means and said peg housing means attached to said sliding means, the other attached to said balance bar;
   said peg means slidably fitting in said peg housing means between a locked position, a balance position when said balance bar is in balance and at least one unbalanced position when said balance bar is unbalanced, and said sliding means sliding in said support between a first position when said peg is in said locked position, an intermediate position when said peg is in said unbalanced position, and a second position when said peg is in said balanced position;

activating means, said activating means sliding said sliding means from said first position to said intermediate position and said second position;

said indicating means indicating when said sliding means is in said second position.

2. The toy of claim 1 wherein:
said peg means is attached to said sliding member and said peg housing means is attached to said balance bar.

3. The toy of claim 2 wherein:
said pivot support means is attached to said support and said pivot means is attached to said balance bar;
said balance bar includes object attaching means located on said balance bar.

4. The toy of claim 3 wherein:
said sliding means includes a sliding member;
said activating means includes a push button means pivotally mounted on said base;
a linking means slidably mounted on said support;
said linking means connecting to said push button means;
a lever arm means;
said lever arm means including a lever arm pivot means;
said lever arm means pivotally mounted about said lever arm pivot means on said support;
said lever arm means attaching to said sliding member, sliding said member from said fixed position to said intermediate position and from said intermediate position to said second position.

5. The toy of claim 4 wherein:
said indicating means includes a bell, a bell clanger means, and a bell clanger activating means.

6. The toy of claim 5 wherein:
said bell clanger means includes a rotary mounted clanger;
said bell clanger activating means includes gear means;
said gear means transfers the motion of said lever means about said lever arm pivot means to said rotary mounted clanger;
said bell attaches to said lever arm means such that as said lever arm means pivots about said lever arm pivot means said sliding member slides from said intermediate position to said second position and said bell contacts said rotary mounted clanger.

7. The toy of claim 6 including:
biasing means, said biasing means biasing said sliding member towards said first position.

8. The toy of claim 3 including:
a plurality of objects;
said plurality of objects forming a set of objects;
at least one of said set of objects having a unit weight;
at least one of said set of objects having a weight equal to said unit weight multiplied by each of the integers of the set 2 through 9;
each of said objects including an object hanging means;
said object hanging means attaching to said object attaching means.

9. The toy of claim 1 wherein:
said sliding means includes a sliding member;
said peg means is attached to said sliding member and said peg housing means is attached to said balance bar;
said activating means includes a push button means pivotally mounted on said base;
a linking means slidably mounted on said support;
said linking means connecting to said push button means;
a lever arm means;
said lever arm means including a lever arm pivot means;
said lever arm means pivotally mounted about said lever arm pivot means on said support;
said lever arm means attaching to said sliding member, sliding said member from said fixed position to said intermediate position and from said intermediate position to said second position;
said indicating means includes a bell, a bell clanger means, and a bell clanger activating means;
said bell clanger means includes a rotary mounted clanger;
said bell clanger activating means includes gear means;
said gear means transfers the motion of said lever means about said lever arm pivot means to said rotary mounted clanger;
said bell attaches to said lever arm means such that as said lever arm means pivots about said lever arm pivot means said sliding member slides from said intermediate position to said second position and said bell contacts said rotary mounted clanger;
and including
activating means, said activating means sliding said sliding member from said first position to said intermediate position and said second position;
biasing means, said biasing means biasing said sliding member towards said first position.

10. The toy of claim 9 wherein:
said balance bar includes object attaching means located on said balance bar;
a plurality of objects;
said plurality of objects forming a set of objects;
at least one of said set of objects having a unit weight;
at least one of said set of objects having a weight equal to said unit weight multiplied by each of the integers of the set 2 through 9;
each of said objects including an object hanging means;
said object hanging means attaching to said object attaching means.

* * * * *